US007917611B2

(12) United States Patent
Calvi et al.

(10) Patent No.: US 7,917,611 B2
(45) Date of Patent: Mar. 29, 2011

(54) METHOD AND SYSTEM FOR MONITORING THE QUALITY OF SERVICE IN TELECOMMUNICATION NETWORKS, COMPONENTS AND COMPUTE PRODUCTS THEREOF

(75) Inventors: Andrea Calvi, Turin (IT); Ivan Pazzini, Turin (IT); Roberto Procopio, Turin (IT); Vito Ribaudo, Turin (IT); Marco Tosalli, Turin (IT)

(73) Assignee: Telecom Italia S.p.A., Milan (IT)

( * ) Notice: Subject to any disclaimer, the term of this patent is extended or adjusted under 35 U.S.C. 154(b) by 1120 days.

(21) Appl. No.: 10/522,632

(22) PCT Filed: Jul. 7, 2003

(86) PCT No.: PCT/EP03/07768
§ 371 (c)(1),
(2), (4) Date: Jan. 24, 2005

(87) PCT Pub. No.: WO2004/010648
PCT Pub. Date: Jan. 29, 2004

(65) Prior Publication Data
US 2006/0125619 A1 Jun. 15, 2006

(30) Foreign Application Priority Data

Jul. 22, 2002 (IT) .............................. TO2002A0640

(51) Int. Cl.
*G06F 15/173* (2006.01)
(52) U.S. Cl. ...................................................... 709/224
(58) Field of Classification Search .................. 709/223, 709/224; 522/224
See application file for complete search history.

(56) References Cited

U.S. PATENT DOCUMENTS 5,850,386 A 12/1998 Anderson et al.
(Continued)

FOREIGN PATENT DOCUMENTS

EP 1039 687 9/2000
(Continued)

OTHER PUBLICATIONS

Frank Fitzek, Providing Application-Level QOS in 3G/4G Wireless Systems, Apr. 2002, IEEE Wireless Communications, pp. 42-47.*

*Primary Examiner* — Krista M. Zele
*Assistant Examiner* — Esther Benoit
(74) *Attorney, Agent, or Firm* — Banner & Witcoff, Ltd.

(57) ABSTRACT

To measure the quality of service at the application level in a telecommunication network (N), a function (A) is provided for carrying out sessions at the application level on said network (N). Through this activation function (A), sessions are then carried out, measuring (F) and also storing ($H_K$ in a set of points ($S_1, \ldots, S_k, S_n$) of the network (N) data indicative of the behavior of said network. The possible occurrence of critical situations relating to quality of service is verified (B) and, upon the occurrence of a said critical situation, a trigger signal (Trigger) is generated. By effect of the generation of said trigger signal, the data indicative of the behavior of the network measured and stored in the aforesaid set of points of the network (N) are collected in centralized fashion (H). The data thus collected are indicative of the end-to-end quality of service of the network (N) itself. Preferential application to packet networks like mobile telephony network such as GPRS or UMTS networks.

22 Claims, 6 Drawing Sheets

U.S. PATENT DOCUMENTS

Figure 11:
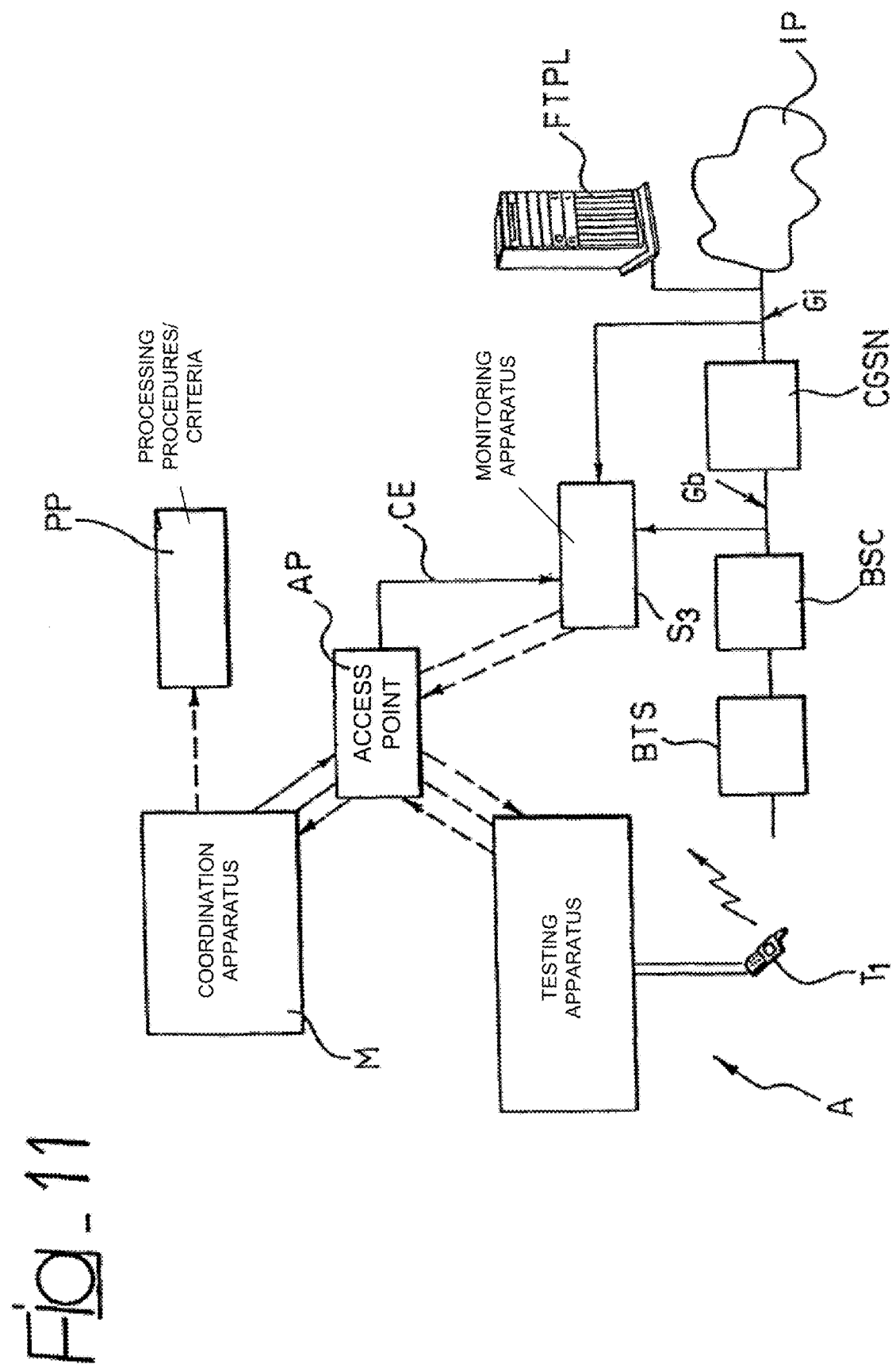

| | | | |
|---|---|---|---|
| 5,958,009 A * | 9/1999 | Friedrich et al. | 709/224 |
| 6,055,493 A * | 4/2000 | Ries et al. | 702/186 |
| 6,108,700 A | 8/2000 | Maccabee et al. | |
| 6,397,359 B1 | 5/2002 | Chandra et al. | |
| 6,621,793 B2 * | 9/2003 | Widegren et al. | 370/230.1 |
| 7,072,961 B1 * | 7/2006 | Maclean et al. | 709/224 |
| 7,350,209 B2 * | 3/2008 | Shum | 718/104 |
| 2002/0055999 A1 * | 5/2002 | Takeda | 709/224 |
| 2003/0152028 A1 * | 8/2003 | Raisanen et al. | 370/235 |
| 2004/0071095 A1 * | 4/2004 | Raisanen | 370/252 |
| 2006/0069621 A1 * | 3/2006 | Chang et al. | 705/26 |

FOREIGN PATENT DOCUMENTS

| WO | WO 00/33511 | 6/2000 |
|---|---|---|

* cited by examiner

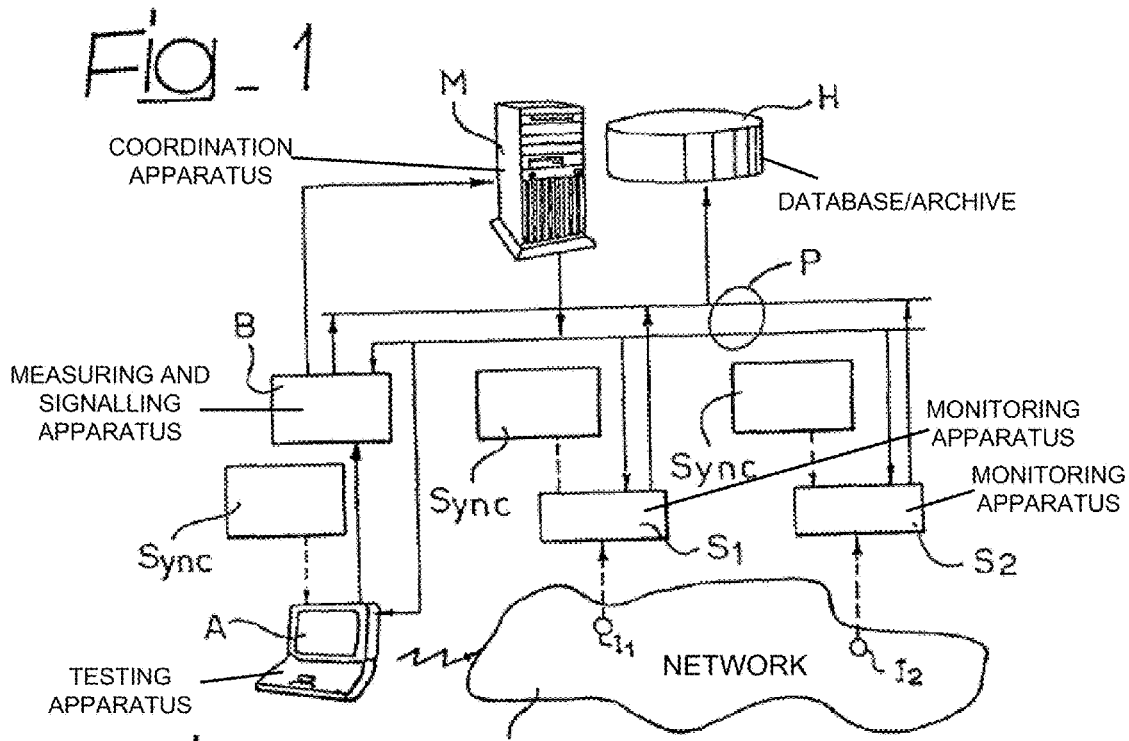
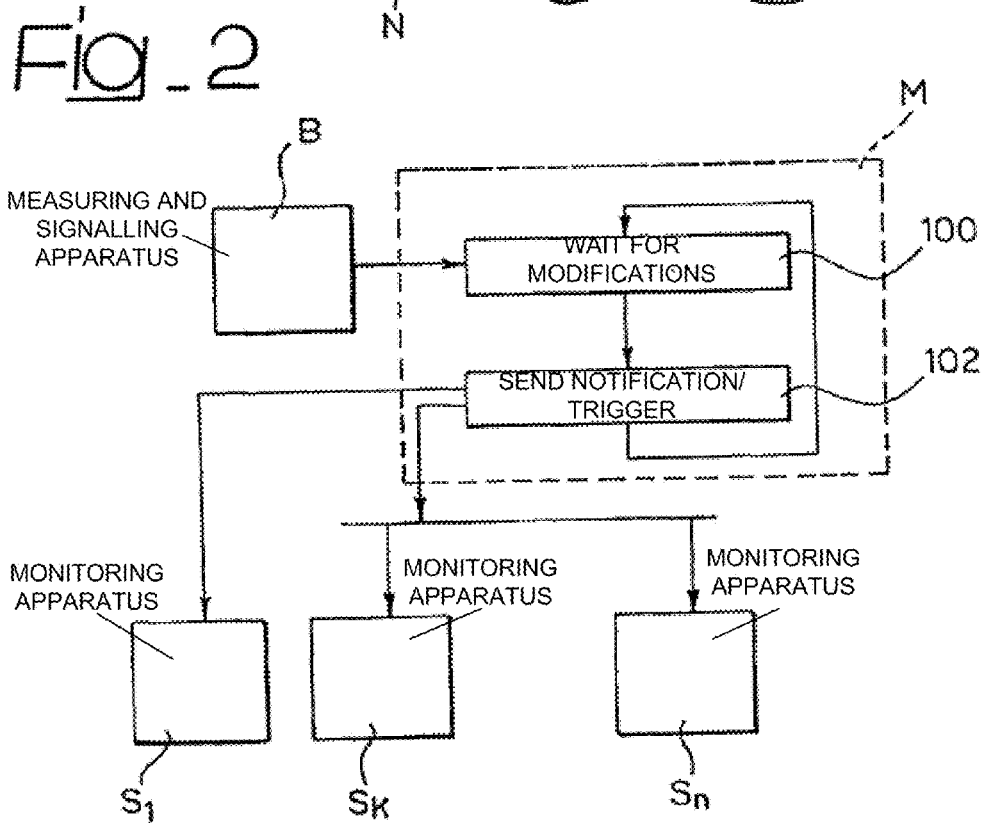

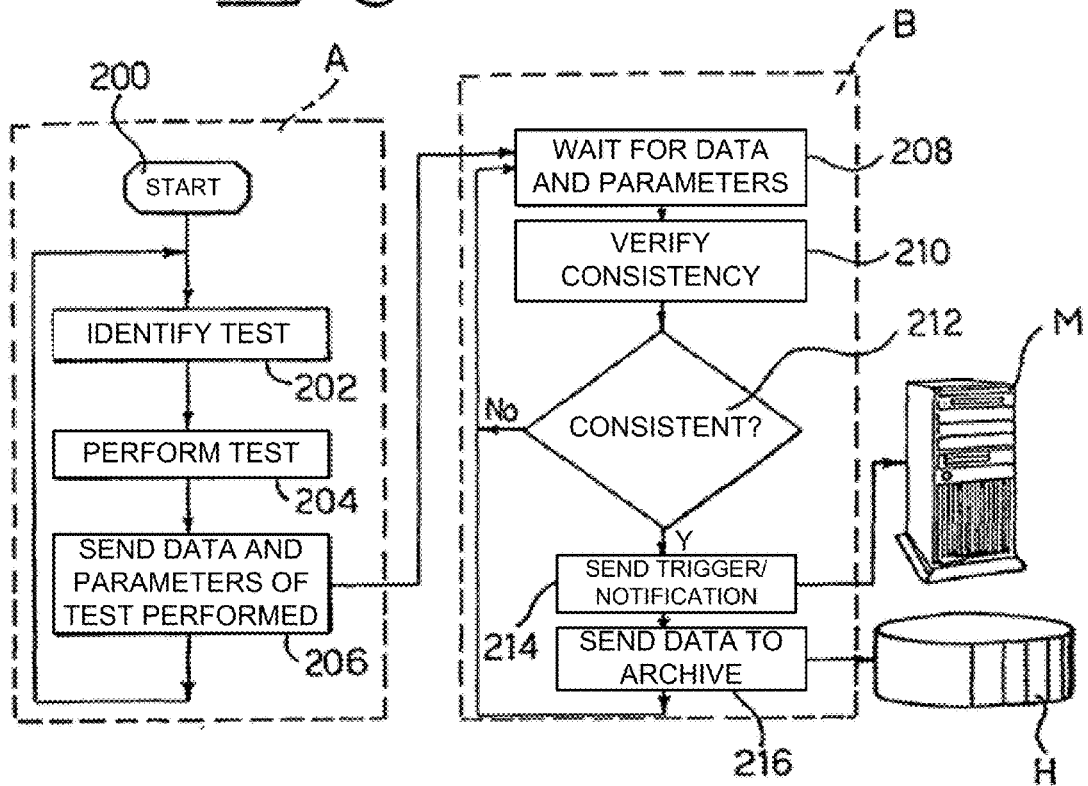
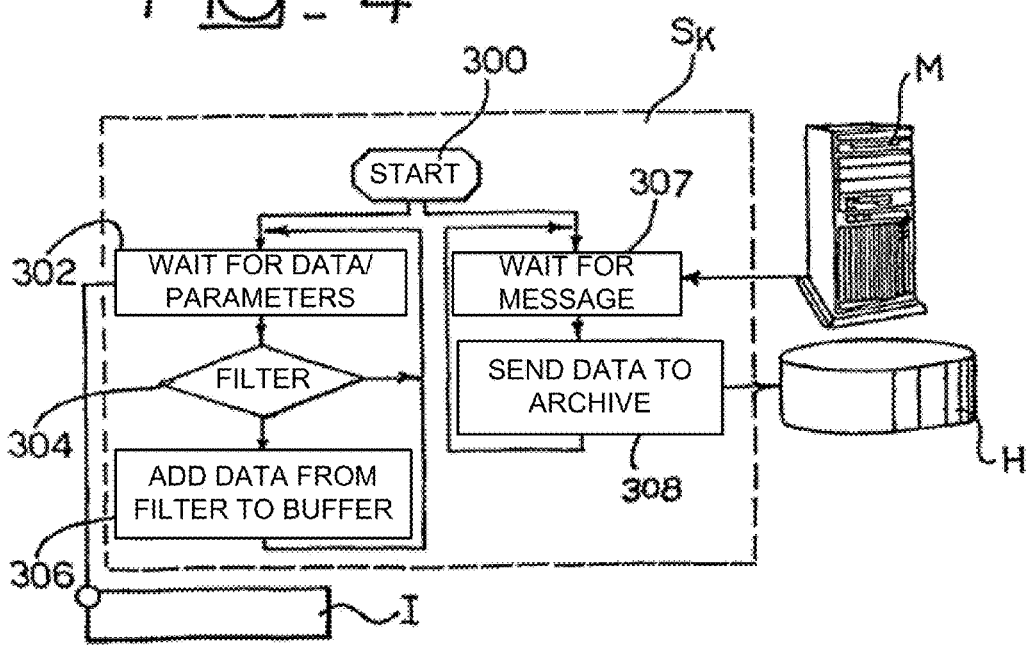

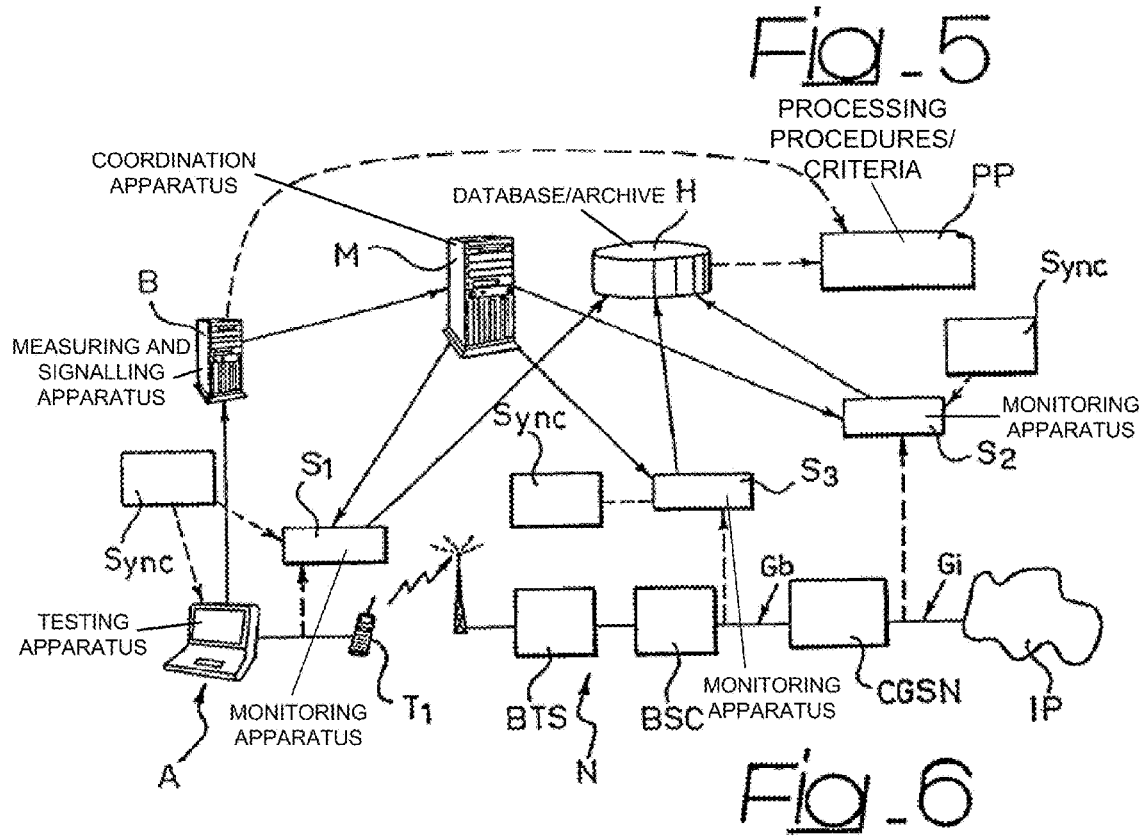
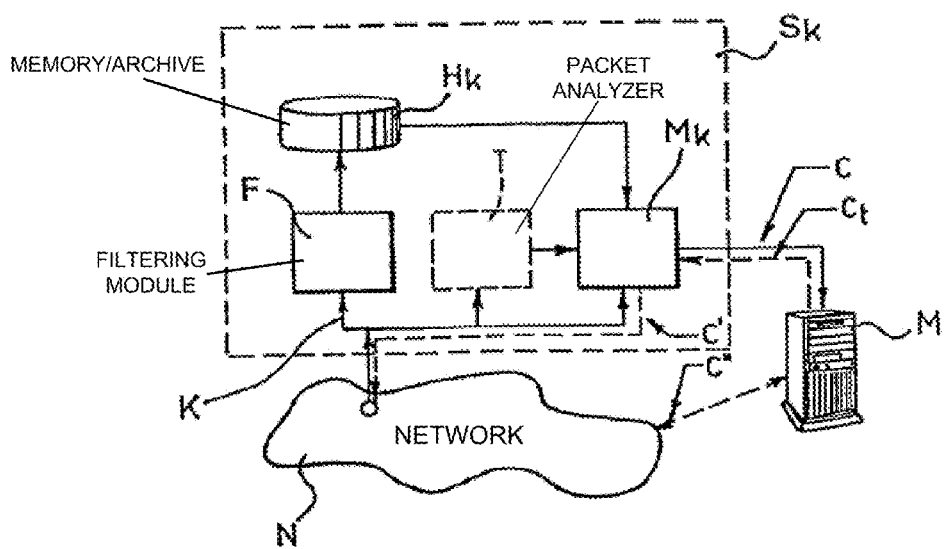

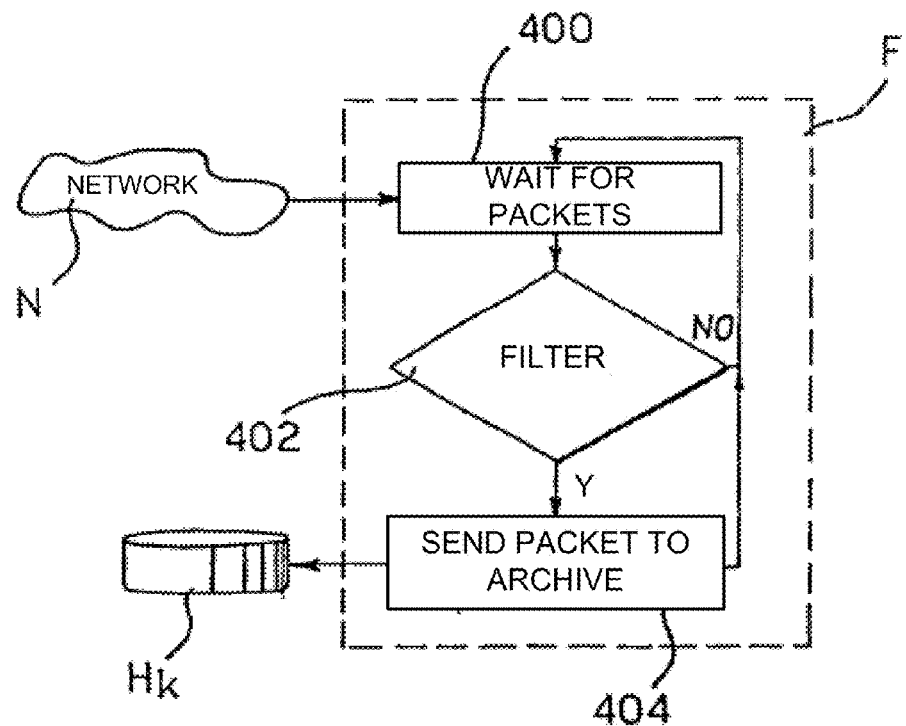
Fig_7
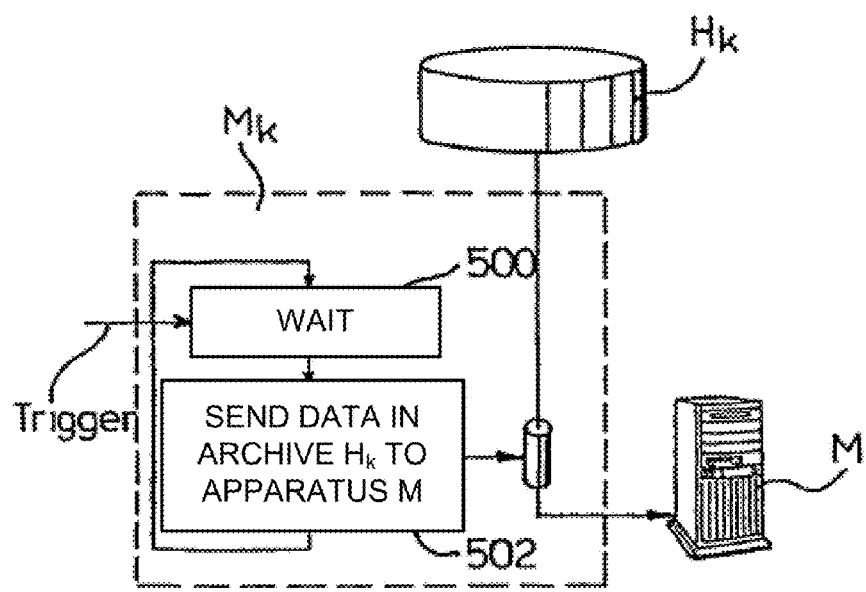
Fig_8

Fig_9
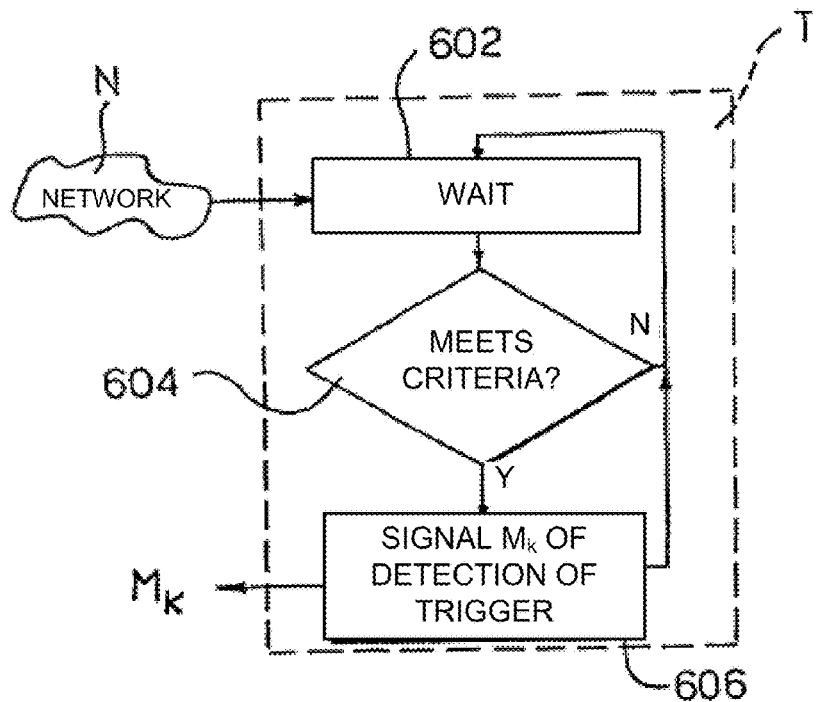
Fig_10
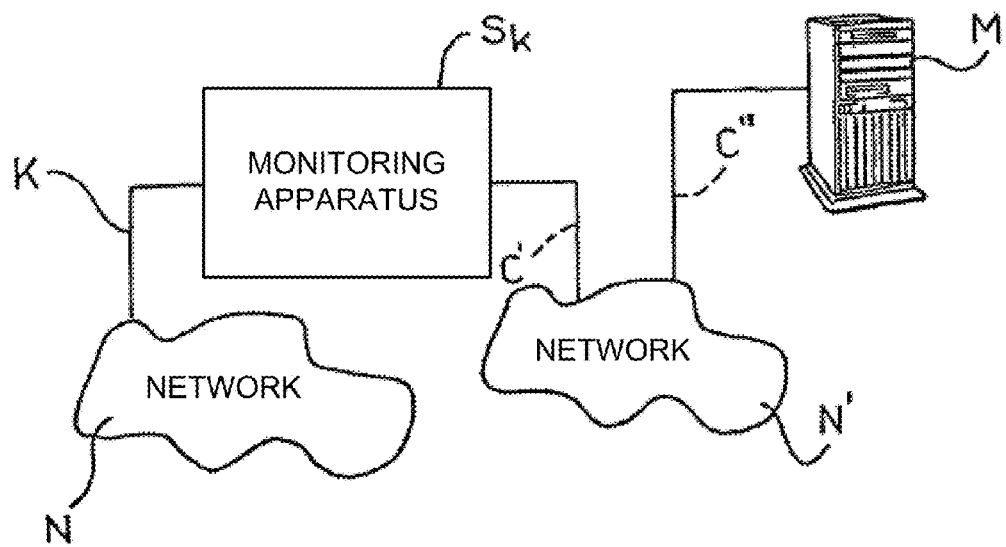

METHOD AND SYSTEM FOR MONITORING THE QUALITY OF SERVICE IN TELECOMMUNICATION NETWORKS, COMPONENTS AND COMPUTE PRODUCTS THEREOF

CROSS REFERENCE TO RELATED APPLICATIONS

This application is the US national phase of PCT application PCT/EP2003/007768 filed 7 Jul. 2003 with a claim to the priority of Italian patent application TO2002A000640 itself filed 22 Jul. 2002.

The present invention relates to the monitoring of the quality of service (or QoS, according to a commonly used acronym) in telecommunication networks.

The invention was developed with particular attention to its possible application to packet telecommunication systems, such as mobile telecommunication systems like GPRS (acronym for General Packet Radio Service) or UMTS (acronym for Universal Mobile Telecommunications System).

In each case, the reference to said sectors of possible application should not be construed as limiting the scope of the invention, which is altogether general.

For monitoring telecommunication networks, there are various known systems, able to operate as distributed protocol analysers, thus able to correlate signalling messages and data in various points of the network.

For example, U.S. Pat. No. 5,850,386 discloses a protocol analyser usable to monitor the operation of digital transmission networks. The analyser in question is able to display statistics at the station level, network statistics, real time information on events occurring on the network as well as information on the distribution of the protocols. Additionally, according to the known solution it is possible to generate basic information on the operation of the network presenting the information simultaneously with real time performance information and monitoring sessions of pre-programming activities. All this while also generating reports linked to the analysis of the transmission network.

Systems of this kind, however, are conceived to operate in extended fashion on the network and therefore are not suitable for occasional use or for being transported.

Moreover, said systems necessarily require the availability of a considerable storage capacity to allow the exhaustive collection of information on appropriate databases.

Also available are protocol analysers able to carry out a thorough punctual analysis of the data that transit on one or more network interfaces.

Substantially deriving from this concept is the solution described in U.S. Pat. No. 6,397,359. In this solution, the performance of a network are assessed defining test schedule comprising test protocols destined to be implemented as well as indications about which protocols are to be executed for a plurality of connections on the network. A connection can be defined between two end nodes of the network and, at specified time instants, the pair of end nodes in question executes the test protocol, measuring the performance of the network connection between the two nodes without thereby entailing any involvement of the application software which can therefore be either installed or not installed on the hardware of the computers that support the end nodes.

In essence, systems of this kind—or substantially equivalent systems—are not suited to correlate the data to be analysed with alarms generated in other points of the system or, better, of the network. Additionally, said systems essentially operate by measuring the performance of the network connection: therefore, they are not able to analyse performance linked to the perceived quality of a specific application session.

In truth, solutions able to monitor quality at the application level do exist. In this regard, reference can be made to the document U.S. Pat. No. 6,108,700, which discloses a solution that allows to measure the response time of an application (including distributed applications in a client/server environment or on the Internet) as perceived by a final user.

Irrespective of all other considerations, systems of this nature, conceived mainly for use on computer networks, are usually not able—when anomalous performance levels are detected—to investigate the causes of malfunction of the network in association with which they operate.

Substantially similar operating criteria, hence exposed to the same limitations outlined above, also drove the design of the product made available with the trade name of ResponseCenter 3.0 by the company Response Networks, Inc. of Alexandria, Va. (United States of America).

It is therefore still necessary to provide a solution that is simultaneously able to:

monitor Quality of Service (QoS) at the application level, and identify the data needed to locate the problem in the network.

All this with specific attention to its possible use in application contexts such as packet telecommunication networks like GPRS or UMTS mobile networks whereto reference was made above.

The aim of the present invention is to provide a solution that is able to meet this requirement.

According to the present invention, said aim is achieved with a method having the characteristic specifically set out in the claims that follow. The invention also relates, in distinct fashion, to the corresponding system, as well as the related component apparatuses and computer products.

The term computer product (or computer program product) hereby indicates a product that can be loaded directly into the internal memory of a digital computer and comprising portions of software code able, when this product is run on a computer, to implement the steps of the method according to the invention and/or to perform the function of one or more of the apparatuses composing the related system.

The solution according to the invention allows to detect events considered critical and to store in detailed fashion the corresponding data flow in the network on the various interfaces considered significant. The data collected can then be post-processed to identify and possibly solve any critical conditions.

The invention shall now be described, purely by way of non limiting example, with reference to the accompanying drawings, in which:

FIG. 1 shows in general terms the architecture of a system able to operate according to the invention, FIGS. 2, 3 and 4 are flow charts showing the possible operation of a system capable of embodying the invention, FIG. 5 shows, in the form of a block diagram, an example of test configuration that can be implemented using the invention, FIG. 6 shows the architecture of a system like the one shown in FIG. 1, FIGS. 7, 8 and 9 are flow charts illustrating the operation of the component of FIG. 6, FIG. 10 schematically shows further characteristics of the component of FIG. 6, and FIG. 11 proposes the diagram of a possible monitoring architecture according to the invention referred to a specific example of application.

In FIG. 1, the reference letter N indicates, in general, a telecommunication network within which a monitoring of the Quality of Service (QoS) and in particular a monitoring of the end-to-end Quality of Service is to be conducted.

By way of indication, without thereby limiting the scope of the invention, the network N can be constituted by a packet telecommunication network such as a GPRS or UMTS mobile network.

The numeric references $S_1$, $S_2$ (and, in general, $S_1$, $S_2, \ldots, S_k, \ldots, S_n$) indicate apparatuses for monitoring the network interfaces to be analysed.

In this regard it will be appreciated that the solution according to the invention is suitable to use a set of such apparatuses (hereinafter generally indicated as $S_k$) comprising any number of apparatuses.

These are apparatuses able to be placed practically in any point of the network N to be analysed. This means that the apparatuses $S_k$ can operate on any network interface deemed to be of interest according to the specific situations, and can thus be connected, in the case of a mobile telecommunication network, both in correspondence with fixed interfaces and in correspondence with mobile interfaces associated with the mobile terminals of the network.

The apparatuses $S_k$ are connected to a bi-directional communication structure, for instance of the bus type, indicated overall as P.

To the structure P is connected a central co-ordination apparatus M whereto is associated a structure for storing the collected data, indicated as H, destined to serve as an archive.

The references A and B respectively indicate an apparatus for conducting test sessions at the application level and a testing apparatus for measuring quality of service at the application level and signalling any critical situations.

Lastly, Sync indicates the elements of a system for synchronising the various apparatuses mentioned above.

Additional indications about specific hardware embodiments of the various apparatuses or modules described above shall be provided in the remainder of this description.

At the general description level, the apparatus A is preferably configured in such a way as to be able repeatedly to execute test sessions at the application level using the resources offered by the network. This can make it necessary to access determined servers inside or outside the network (not shown in the figure), able to provide the requested service.

For each test, the apparatus A sends to the apparatus B information that allow it to evaluate the measured quality of service, as well as information on times and, if necessary, the same data sent or received by the network.

Based on the information received by the apparatus A, the apparatus B treats the data received in order to verify its consistency or inconsistency with determined quality of service (QoS) criteria.

In the most current applications, the data in question are compared with reference thresholds available within the apparatus B, which is able to generate an alarm if the data received are found to be inconsistent with the aforesaid thresholds.

The alarm is notified to the apparatus M and the data collected by the apparatus A are also sent, when necessary, to the archive H.

The communications in question are preferably exchanged through the same structure P. However, a direct connection between the apparatus B and the apparatus M can be provided—in the direction shown—to allow alarm messages to be forwarded.

The apparatuses $S_k$ are destined to co-operate with the interfaces whereon it is considered useful to perform the monitoring action. Two of said interfaces, indicated as $I_1$ and $I_2$, are represented in FIG. 1; hereinafter, the generic monitored interface shall be indicated as $I_k$. Typically, it can be any data or signalling interface involved in the application level operations relating to the tests conducted by the apparatus A.

In the case of a network N constituted by a packet network, the packets that transit on said interfaces $I_k$ can be collected (possibly filtering—according to criteria better described hereafter—only the traffic of interest for the test) by the monitoring apparatuses $S_k$. The packets thus collected are stored by each apparatus on a memory such as a circular buffer of appropriate size (not specifically shown in the drawings, but of a known type) able to retain information for a sufficiently long period of time. The dimensioning criteria of such a memory are described in greater detail hereafter.

Each monitoring apparatus $S_k$ can also receive a trigger signal from the apparatus M. At the occurrence of such an event, each monitoring apparatus $S_k$ is capable of sending to the archive H the data contained in its circular buffer, continuing the monitoring action.

In a preferred embodiment of the invention, additional commands are also provided, able to be sent by the apparatus M, for instance to start or stop the monitoring activity or, in general, to perform administrative operations on the apparatus.

The apparatus H serving as an archive has the purpose of centrally collecting all data correlated to events detected as anomalies. In particular, for each anomaly, in the archive H there are collected data coming:

from the apparatus A to conduct the tests at the application level, from the apparatus B to measure the quality of service and from the other monitoring apparatuses $S_k$ associated to the interfaces $I_k$ to be analysed.

The central co-ordination apparatus, indicated as M in FIG. 1, has the purpose of controlling in centralised fashion all other apparatuses included in the illustrated architecture. The functionality of the apparatus M provides that, upon receiving an alarm trigger signal from the apparatus B, the apparatus M sends corresponding trigger signals to all interface monitoring apparatuses.

In the currently preferred embodiment of the invention, the apparatus M is also configured in such a way as to perform additional functions, for instance to allow remotely controlling all apparatuses, activating them, deactivating them or configuring them as needed.

An important role within the architecture illustrated in FIG. 1 is performed by the synchronisation system comprising the apparatuses indicated as Sync. Said apparatuses can be present in any number, also as a function of the general lay out (centralised or decentralised architecture) selected for the synchronisation system. Usually, to allow for an easy use of the system, the individual elements of the synchronisation system can also be located at a certain mutual distance, possibly even in geographic locations that are quite distant from one another.

The presence of the synchronisation system in question is linked to the observation of the fact that in order to assess performance it is important to take into account the time required to traverse the network by the packets/signals. This presumes the fact that the various apparatuses between which the aforesaid traversing times are measured are in fact mutually synchronised. The accuracy of the system is determined in such a way as to be compatible with the precision of the information to be obtained.

The diagram of FIG. 2, substantially constituting a flow chart, shows the basic operation of the central co-ordination apparatus M.

In essence, the apparatus M operates by cyclically performing, with a speed that is correlated to the speed with which the phenomena to be monitored evolve, a cyclic routine comprising a first step 100 of waiting for any modifications coming from the apparatus B followed—in the presence of such a notification received from the apparatus B—by a step 102 in which a corresponding notification or trigger is sent to the various apparatuses for monitoring the interfaces $S_1, \ldots, S_k, \ldots, S_n$.

The flow chart of FIG. 3 shows, in a manner fundamentally similar to the one adopted in FIG. 2, the operation of the apparatus or apparatuses for conducting tests and measuring quality (reference A and B in the same figure).

FIG. 4 instead shows the operation of any of the apparatuses $S_k$ provided for monitoring the interfaces $I_k$.

The figures in question naturally are purely illustrative in nature and are reproduced in simplified fashion to facilitate comprehension: it will be appreciated that neither FIG. 2 nor FIGS. 3 and 4 show the normal management functionalities such as starting processes, initialising and terminating processes, etc.

Focusing first on the apparatus for conducting the tests (reference A in FIG. 1), the step 200 in FIG. 3 indicates a normal starting step followed by a step 202 in which the apparatus A identifies (according to programming/scheduling criteria set therein—according to criteria that are known in themselves) the test destined to be conducted on each occasion.

This test is then performed in a step indicated as 204; in a step 206 the apparatus A sends to the apparatus B, preferably on a dedicated connection, the data and parameters relating to the test performed.

Once this transmission is complete, the operation of the apparatus A evolves again upstream of the step indicated as 202 to proceed with a successive test.

It is evident that this test can consist both of a "new" test relative to the one performed previously, and of an "old" test already performed previously and repeated after a certain time interval.

The step indicated as 208 in FIG. 3 corresponds, with reference to the apparatus B, to a generic waiting step in which the apparatus B waits to receive data and parameters relating to the tests conducted (according to the procedures described above) from the apparatus or apparatuses A included in the system.

After receiving said data and parameters, in a step indicated as 210 the apparatus B verifies whether the information is consistent or inconsistent with determined quality criteria represented by corresponding data stored in the apparatus B.

In the most current application example, said criteria are simply represented by predefined threshold levels which the data and the quality parameters received from the module B are compared.

All this to proceed then, in a subsequent step 212, with a selection or decision operation aimed at determining whether the aforesaid data or parameter are consistent or inconsistent with respect to the predefined acceptability criteria stored in the apparatus B.

If the aforesaid data and parameters are not outside the prescribed limits (negative outcome of the step 212, indicative of the fact that the test whereto the data and parameters in question refer detected no anomalous situation) the operation of the apparatus B again evolves towards the waiting step indicated as 208.

Otherwise (positive outcome of the comparison carried out in the step 212, indicative of the fact that the data and parameters from the test conducted did detect the presence of an anomalous situation), the apparatus B proceeds with a step 214 to send a corresponding notification or trigger message to the apparatus M. The apparatus B, in a step 216, also sends to the archive H the collected data and parameters, which are indicative of (and identify) the anomalous situation detected thanks to the test performed by the apparatus A.

The flow chart of FIG. 4, pertaining to the operation of a generic apparatus $S_k$ for monitoring the interfaces $I_k$, also starts from an initial step 300 to evolve in preferred fashion in two directions according to a typical concurrent process model.

The first direction of evolution is towards a step 302 in which the apparatus $S_k$ awaits a packet of data/parameters from the respective interface $I_k$ being examined.

The reference 304 indicates a step in which the apparatus performs a filtering function according to the procedures better described hereafter. Said filtering step or operation—which in itself incorporates successive processing operations—can evolve both with a return upstream of the step 302 (when the filtering operation fails to give rise to any appreciable result) and towards a step 306 in which the data deriving from the filtering operation are added to the circular buffer associated to the apparatus $S_k$. All this to then recycle upstream of the step 302.

The other process performed within the apparatus $S_k$ instead comprises a first step 307 of generic waiting for a message or trigger generated—according to procedures better described hereafter—by the apparatus M. All this to proceed, in a subsequent step indicated as 308, performed upon receiving the aforesaid trigger signal, which comprises sending the data contained in the circular buffer of the apparatus $S_k$ to the archive H.

The apparatus for performing the test indicated as A then operates by continuously performing a test at the application level and sending to the apparatus for measuring the quality of service, indicated as B, the measured performance data. Simultaneously, the monitoring apparatuses $S_k$ intercept the packets considered to be of interest on the checked interfaces $I_k$, storing them in their own circular buffers.

If the apparatus for measuring the quality of service B signals an alarm, the central co-ordination apparatus M sends a trigger signal to the monitoring apparatuses $S_k$, which send to the archive H a copy of their circular buffer, continuing the monitoring operation.

In this way, in the presence of an alarm, the collected packets refer to a previous time window. Their analysis can therefore allow to obtain detailed information, for instance to locate the so-called "bottlenecks" inside the network.

The circular buffers of the monitoring apparatuses $S_k$ are dimensioned to assure that all information relating to a test session that may cause an alarm are saved. For said dimensioning, one thus takes into account the type of session, the reasonably expected duration of the session (also in case of problems), the quantity of data that, downstream of the filter, is collected on the buffer, and the delay times between the emergence of the critical situation and the arrival of the trigger signals to the monitoring apparatuses $S_k$.

FIG. 5 shows an example of test configuration applied to a usage scenario in which the network N is constituted by a GPRS network.

In particular, it was assumed that the performance of the radio interface and of the CGSN (Combined GPRS Support Node) are to be tested. The node in question incorporates the functionalities of the so-called GGSN (Gateway GPRS Support Node) and of the so-called SGSN (Serving GPRS Support Node).

The diagram of FIG. 5 highlights, in addition to the CGSN node, also a radio base station or BTS (Base Transceiver Station) and the BSC (Base Station Control) module associated therewith.

Also highlighted is the connection between the CGSN node and a corresponding IP (Internet Protocol) network.

Moreover, the reference T1 indicates any mobile terminal included in the network, presently connected to the BTS station shown herein.

Although the representation of FIG. 1 is limited to a single CGSN node, to a single BTS station, to a single BSC controller and to a single mobile terminal T1, it will be appreciated that the field of application of the invention generally encompasses any number of said elements.

The diagram of FIG. 5 also shows the same references already introduced in relation to FIG. 1, which makes it superfluous to provide a new description of the role played by each of the elements indicated by said references.

In regard to possible implementation details (described herein purely by way of example and hence with no intent to limit the scope of the invention in any way at all) the mobile terminal T1 can be constituted by any GPRS mobile terminal, preferably provided with the ability to analyse the performance of the radio interface; it can be, for instance, a terminal of the type sold with the trade name of TEMS version 3.2 or higher by the company Ericsson.

The apparatus A can be constructed by means of personal computers and in particular by using the agent (or client—hereinafter the two names shall be used equivalently) structure perfected by the Applicant and identified with the name of BMPOP. Said agent solution, able to measure the end-to-end quality of service (QoS) at the application level and to send the collected data to a corresponding remote BMPOP server (apparatus B) can advantageously be implemented on a portable personal computer with the following characteristics:
Pentium IV, 500 MHz processor,
RAM 512 MB,
Windows NT/2000,
hard-disk 20 GB,
dual RS232 serial interface (able to achieve the connection to the aforementioned terminal TEMS), and
GPS (Global Positioning System) function for synchronisation.

One or more of the trade names reproduced above and/or hereafter may correspond to de facto and/or registered trade marks.

The aforementioned BMPOP server, destined to serve the function of the apparatus B can be implemented on a PC (also of the fixed type, implementation on portable PC being instead preferred for the apparatus A) having the following characteristics:
Pentium IV, 500 MHz processor,
RAM 512 MB,
Windows NT/2000,
Oracle 8 database, and
hard-disk 34 GB.

This server is configured to operate as a centralised system to collect the data provided by the client A.

In particular, as seen above, the server B is able to send alert or trigger messages to the apparatus M that serves as master of the system, if anomalies are detected. The apparatus M operates as a generalised system for managing and co-ordinating quality monitoring in co-operation with the archive H.

The latter is constituted by a data base able to collect, through the apparatus M, the data provided by the various monitoring apparatuses $S_k$ and by the server B.

From the viewpoint of practical realisation, the apparatus M and the archive H associated thereto can be implemented on a same personal computer, for instance using a computer with the following characteristics:
Pentium IV, 500 MHz processor,
RAM 512 MB,
Windows NT/2000, and
hard-disk 40 GB.

On this computer resides a simple application program (able to be realised according to criteria that are known, and hence such as not to require a detailed description herein) able to receive—according to the procedures described above—a trigger signal from the server B and to send corresponding trigger messages to the various apparatuses $S_k$ (whereof there are three, indicated respectively as $S_1$, $S_2$ and $S_3$ in the embodiment illustrated herein).

Said trigger signal can be obtained by sending a particular IP packet.

In the specific example of application—which, it is yet again specified, is in fact merely an example—whereto FIG. 5 refers, to each of the apparatuses $S_1$, $S_2$ and $S_3$ is associated a respective synchronisation module Sync—of a known type—preferably GPS based.

The apparatuses $S_1$, $S_2$ and $S_3$ can advantageously be realised using the solution known with the trade name of SNIFFER (Network General Corp.).

In the example illustrated herein, the first apparatus $S_1$ is associated to the mobile terminal T1 with the function of detecting the passage of the packets downstream of the application supported by the apparatus A and of sending the related data to the archive H.

The apparatus $S_2$ is configured to store traffic on the interface Gi between the node CGSN and the IP network and in this case as well to send the related information on request to the archive H.

The apparatus $S_3$ is also a protocol analyser, able to analyse the interface Gb between the node CGSN and the module BSC. It can be, for instance, a TEKTRONIX K1297 analyser.

From the implementation point of view, the apparatus $S_1$ can be configured, for example, using a normal serial line SNIFFER solution installed on the same personal computer that houses the client A (for example EtherPeek version 3.6.2 by WildPacket's).

The apparatus $S_2$ can also be installed on a personal computer with the following characteristics:
Pentium IV, 500 MHz processor,
RAM 512 MB,
Windows NT/2000, and
hard-disk 20 GB.

The apparatus $S_2$ preferably has the following characteristics:
it is able to store in a buffer, preferably of the circular type, the IP packets that pass on the interface Gi,
it is able to interpret a trigger that activates an appropriate predetermined operative process, and
it is able, given the aforesaid trigger, to send the collected data to the archive H.

A possible implementation can be based on the primitives offered by the library WinPcap version 2.3 or higher.

As stated previously, the apparatus $S_2$ is preferably connected to a GPS device to assure synchronisation with the other apparatuses.

The apparatus $S_3$ (able, as stated, to be implemented with Tektronix K1297 instrumentation or equivalent instrumentation), preferably has the following characteristics:
- it is able to control the protocol stack of the GPRS on the interface Gb;
- it is able to store on a buffer, preferably of the circular type, the packets that pass on the aforesaid interface,
- it is able to receive and interpret a trigger that activates an appropriate predefined operative process, and
- it is able, given the aforesaid trigger, to send the collected data to the archive H.

In this case too, synchronisation is preferably achieved by connection to a GPS device.

Additional characteristics of realisation of the apparatuses $S_1$, $S_2$ and $S_3$ (or of equivalent apparatuses) shall be described hereafter.

Still with reference to the diagram of FIG. 5 it can be recalled that—in the currently preferred embodiment—the mobile terminal T1 can also be configured to perform functionalities of monitoring the radio interface: the related software for managing and controlling said functionalities resides on the same personal computer that houses the agent indicated as A.

In essential terms, and referring to the same general operating criteria described above, the operation of the solution illustrated in FIG. 5 provides for the apparatus A serving as agent to perform continual tests of the end-to-end quality of service towards specific destinations (for instance towards specific server addresses on the IP network).

The apparatus $S_1$ detects the passage of the packets and the times thereof, sending the corresponding information to the archive H.

Simultaneously, the apparatuses $S_2$ and $S_3$ continuously monitor respectively the interface Gi and the interface Gb, filtering the packets exchanged between the agent A and the remote servers connected through the IP network.

The data are collected in corresponding buffers. Preferably, these are circular buffers in which the oldest data are overwritten. When the server B detects a critical situation, it sends—through the apparatus M serving as master—a warning message or trigger to the apparatuses $S_1$, $S_2$ and $S_3$. These apparatuses copy the data collected up to that moment and send it to the archive H.

The data thus collected (and any other data that may have been provided directly by the apparatus B—note the dashed line at the upper end of FIG. 5) are thus made available for processing.

The processing operation typically has a post-processing character, since most of the time it is a function of analysis of the collected data, able to be performed both automatically and semi-automatically with the intervention of one or more operators. It will be appreciated that the criteria and the procedures for carrying out said processing operation, indicated as PP in the diagram of FIG. 5, are outside the specific scope of the present invention.

In a context like the GPRS context whereto FIG. 5 refers by way of example, it is possible to identify quality indicators such as:
- down-link and up-link crossing times through a network segment (access network, CGSN node, etc.);
- TCP (Transmission Control Protocol) losses and re-transmissions on the IP interfaces,
- evaluation of the windows used by the TCP protocol, and correlation between the RLC (Radio Link Control) and TCP protocols.

The currently preferred embodiment in relation to the architecture of the apparatuses $S_k$ will now be described with reference to the diagram of FIG. 6.

In this regard it will appreciated that such an architecture can be used advantageously both to realise all the apparatuses $S_k$ and to realise only some of said apparatuses.

For instance, with reference to the architecture shown in FIG. 5, all three the apparatuses $S_1$, $S_2$ and $S_3$ serve the function of monitoring transiting packets, also exhibiting the characteristic of being controllable remotely and of sending to an equally remote server the collected information.

Solutions capable of detecting packets transiting on a packet telecommunication network, also operating appropriate filtering actions, are already available today (see in this regard the considerations made in the introductory part of the present description). Also known are more complex hardware and software systems, able to monitor multiple network interfaces, to recognise and interpret multiple standard protocols. All this, if necessary, with the ability to interpret the passage of determined packets or messages contained therein as alarm or trigger messages, able to activate determined behaviours by the system.

A common characteristic of said known systems is that of providing for the possibility of locally storing the measured data, in order to constitute an archive that can be consulted a posteriori.

Within the context of the present invention, however, it is important to have available apparatuses capable of being used remotely, i.e. apparatuses able locally to detect the packets, to filter and store the information and to send to a remote server the collected data, given the occurrence of determined events.

The diagram of FIG. 6 represents the general architecture of any module $S_k$ able to be included in a system of the type illustrated in FIGS. 1 and 5.

To facilitate comprehension, the diagram of FIG. 6 shows only, in addition to a single apparatus $S_k$, the network N to be analysed and the apparatus M acting as remote server destined to send to the various apparatuses $S_k$ (by effect of the reception of an alert or trigger signal by the apparatus B in FIGS. 1 and 5) corresponding trigger signals destined to cause the apparatus $S_k$ involved on each occasion to send the data it has available to the apparatus M.

The general architecture of the apparatus or module $S_k$ comprises, in the currently preferred embodiment:
- a packet filtering module, indicated as F,
- a memory $H_k$ for archiving the data at the $S_k$ module level,
- an apparatus $M_k$ to perform—also at the local level—a co-ordination function, and
- a set of connection functionalities.

In the first place, a connection functionality K is provided, operating between the network N and the apparatus $S_k$ for the collection of the monitoring data relating to the interfaces $I_k$.

In regard to the transmission of the monitoring data from the apparatuses $S_k$ to the apparatus M and for the transmission of the trigger signal from the apparatus M to the various apparatuses $S_k$, different solutions can be employed.

For example, it is possible to provide a main connection function C for the transmission of the monitoring data from the apparatuses $S_k$ to the apparatus M and an auxiliary function $C_t$ for the transmission of the trigger signal from the apparatus M to the various apparatuses $S_k$.

As a total or partial alternative, for the transmission of the monitoring data from the apparatuses $S_k$ to the apparatus M and/or for the transmission of the trigger signal from the apparatus M to the various apparatuses $S_k$, it is possible to use the same network N to be monitored.

In this case it is possible to provide a first connection functionality, indicated as C', for the transmission of the monitoring data from the apparatuses $S_k$ to the network N and a second connection functionality, indicated as C", operating between the network N and the apparatus M. This second connection functionality can be used both for the transmission of the monitoring data from the network N to the apparatus M and for the transmission of the trigger signal from the apparatus M to the network N.

When this latter solution is adopted, in the individual module $S_k$ is also present a sub-module or device for intercepting the trigger messages, indicated as T. The device T analyses the packets transiting in the network and, if it detects packets that meet definable criteria—according to known criteria—during the configuration of the apparatus $S_k$, it interprets said packets as trigger signals, giving communication thereof to the respective module $H_k$ so it will operate accordingly.

The packet filtering system F performs a selection of the packets transiting in the network (for instance on the interfaces Gi and Gb in the case of the apparatuses $S_2$ and $S_3$ of FIG. 5). This occurs according to defined criteria—in a known manner—during the configuration of the individual apparatus $S_k$. Only the packets that meet the predefined criteria are considered and sent to the local archive $H_k$.

The data archiving module $H_k$ serves the function of archiving the packets that come from the filtering module F. As stated, to implement the module $H_k$ a circular buffer archive is currently preferred, in which the oldest data are overwritten in order to limit to a maximum value (determined selectively as a function of the application requirements) the quantity of data stored.

Said quantity is defined—also according to known criteria—when configuring the apparatus $S_k$ taking into account the desired extension of the time "window" of observation associated with the data that, stored at the level of the individual apparatus $S_k$, are then transmitted to the apparatus M in view of their storage in the centralised archive H.

It is preferable for the filtering module F to be able to discard all traffic generated by the apparatus $S_k$ whereto it is associated, including the traffic generated to send the data to the apparatus M.

The flow charts of FIGS. 7, 8 and 9 show in greater detail the operating criteria of the filtering module F, of the co-ordination module $M_k$ and of the module T (if present).

In this case as well, as in the case of FIGS. 2 through 4, for the sake of illustration simplicity the additional management functionalities, which nonetheless are present, are not depicted: for example, process starting, initialisation, termination etc.

The operation of the module F essentially comprises three successive steps, repeated according to a cyclical order.

The first step, indicated as 400 in FIG. 7, consists of waiting for the packets starting from the network N or, more precisely, from the monitored interface.

The packets received are then subjected, in a subsequent step indicated as 402, to the actual filtering function.

If the packet considered on each occasion is not relevant for purposes of the monitoring function (negative outcome of the step 402) the related packet is discarded and the system returns to the waiting step 400.

If, on the contrary, the step 402 yields a positive outcome, indicating that the packet considered on each occasion is relevant for purposes of the monitoring function, in a subsequent step 404 said packet is sent to the archive $H_k$ and the system returns to the waiting step 400.

As has been indicated several times, the buffer $H_k$ is preferably organised in the form of circular buffer, in which the oldest data are overwritten by the most recent ones. Said buffer must be correctly dimensioned to assure the saving of all information of interest about a processing session. For said dimensioning, therefore, the type of session, its duration and the quantity of data collected on the buffer downstream of the filtering function are taken into account.

The operation of the module $M_k$ essentially comprises a waiting step 500, in which the module $M_k$ detects the possible arrival of the trigger signal (received—with reference to the architecture represented in FIGS. 1 and 5—from the module M).

All this to proceed, upon receiving said signal, to send to the apparatus M the data contained in the archive $H_k$. This sending step is indicated as 502 in the diagram of FIG. 8.

The flow chart of FIG. 9 refers to the operation of the module T able to proceed with the detection of the trigger signal when said signal, instead of being received starting from the apparatus M, is generated inside the apparatus $S_k$ by means of an operation of observation of the packets transiting on the network N.

In FIG. 9, the related waiting step is indicated with the reference 602, whilst the reference 604 indicates a successive checking step in which the module T examines the packet received from the module T to establish whether it meets the criteria to identify said packet as corresponding to a trigger signal.

If the outcome is negative, the operation of the module T simply evolves backwards upstream of the waiting step 602.

If the step 604 has a positive outcome, the module T signals to the apparatus $M_k$ the detection of a trigger.

The preferential hardware and software configurations for implementing the apparatuses $S_k$ and M by means of personal computer have already been described above.

The diagram of FIG. 10 aims further to highlight the fact that the individual apparatus $S_k$ can advantageously be configured in such a way as to have a connection K towards the network N to be analysed, as a set of connection functionalities towards the apparatus M able to be both direct (functionality C, $C_t$ of FIG. 6) and indirect (functionality C' and C" in the same FIG. 6).

As illustrated above, the connection functionalities between the apparatus $S_k$ and the apparatus M can transit either on an appropriate network (for instance a LAN or Local Area Network) or exploiting for connection purposes the same network N to be analysed.

The personal computer used to implement the apparatuses $S_k$ is therefore usually provided with the interfaces required for the described connections, whilst the program, able to configure said apparatus as an FTP (File Transfer Protocol) server, can advantageously be installed on the apparatus M. An advantageous solution in this regard is the solution available with the trade name of BulletProof FTP server 2.15.

Advantageously, as a trigger signal it is possible to use an ICMP (Internet Control Message Protocol) packet with a predetermined payload.

The mechanism for capturing the packets, filtering and detecting the trigger signal (if provided at the level of the apparatus $S_k$) can easily be achieved with the primitives offered by the aforementioned WinPcap library. The captured packets can be saved on a circular buffer realised by writing on three files in rotation, with the passage from one file to the other occurring upon exceeding a given dimension (for instance one MB for each file). When capturing the packets, a simple verification of their content at the ICMP level (which bears directly on the Internet Protocol IP) allows to detect the trigger. Upon detecting the trigger, the three files whereon the data archiving is to be continued are changed and the files previously used are sent to the remote FTP server by means of the FTP command. The sent files can then be deleted from the archive of the apparatus $S_k$.

By way of additional example of possible use of the solution according to the invention, with reference to the diagram in FIG. 11 the description is provided of the implementation of a specific function for measuring quality of service carried out in a GPRS environment of the type already illustrated with reference to FIG. 5.

It is recalled once again that reference to such a possible application context must not be construed in any way as limiting the scope of the invention.

In the specific case considered in FIG. 11, the situation is assumed to be one in which the end-to-end quality of service is negatively influenced by the fact that the software for managing the radio resources used in the GPRS network does not operate properly and, as a result, it occasionally subtracts radio resources from a user, then reallocates them with a consequent loss of throughput coinciding with these events.

FIG. 11 represents an example of architecture that allows to identify the aforesaid problem.

It will be appreciated that this figure shows several apparatus/modules already illustrated with reference to the diagrams of FIGS. 1 and 5. For this reason, the description of the nature and of the function of these modules is not repeated herein.

With respect to the elements already showed in FIGS. 1 and 5, FIG. 11 illustrates the presence of an access point AP serving as WLAN (Wireless Local Area Network) access point and the presence of a local FTP server, indicated as FTPL, connected to the interface Gi between the node CGSN and the network IP. The access point AP is connected through an Ethernet cable CE to the apparatus $S_3$ (implemented by means of Tektronix K1297 instrumentation).

The same FIG. 11 also shows the WLAN connections existing between the node AP and the apparatus M, the apparatus A and the apparatus $S_3$. Said connections (destined to assure the various functionalities of transmission of the trigger over cable, of the trigger over WLAN, of synchronisation on WLAN, as well as data transmission over WLAN) operate according to known criteria, which do not require a detailed description herein.

In this case the mobile terminal T1 connected to the apparatus A acting as client is a test terminal able to monitor the radio interface. It can be, with reference to the examples provided above, a TEMS terminal produced by Ericsson, equipped with the management software called TEMS Investigation.

It will also be appreciated that the apparatus indicated as $S_3$ in the diagram of FIG. 11 in fact incorporates functionalities of monitoring both interfaces Gi and Gb which, in the diagram of FIG. 5, are shown attributed to two different apparatuses indicated respectively as $S_2$ and $S_3$.

The diagram of FIG. 11 corresponds in this regard to an implementation simplification linked to the fact that, in the context considered herein, it is possible to aggregate both monitoring functions and have a single instrumentation set perform them.

This fact also allows to perceive that the general architectures shown in FIGS. 1 and 5 can easily be subject, thanks to their very flexibility, to implementation variations of this nature.

The choice—preferential but certainly not imperative—to use a local FTP server, such as the server FTPL shown in FIG. 11, is mainly linked to the desire not to introduce delays and losses typical of the Internet world.

The tests are performed in a controlled radio environment. To this end, the GPRS channels are allocated statically and only one user is allowed. Said user is thus able to exploit all the radio resources the network makes available for a given cell served by a particular BTS.

The apparatus A performs continuous FTP download tests from the server FTPL and computes throughput at the application level. Through the test terminal management function, it is possible to monitor all messages on the radio interface and simultaneously, through the protocol analysis function implemented by the apparatus $S_3$, the packets transiting on the network interfaces Gb and Gi are recorded to compute the throughput inside the network.

The data collected by the apparatus A indicate an occasional throughput drop. On the other hand, the data collected on the interfaces Gb and Gi indicate that there are no delays as would justify the anomaly, at the core network level. Analysis of the data collected starting from the mobile terminal T1 highlights the presence of messages indicating losses subsequent to reallocation of radio resources by the network in a situation in which this should not occur (the test conditions provide, as stated, for the presence of only one user with static allocation of the resources). The performed analysis therefore allows to conclude with certainty that the problem resides in the malfunction of the radio resource management function used by the system.

Naturally, without varying the principle of the invention, the realisation details and the embodiments may be widely varied from what is described and illustrated herein, without thereby departing from the scope of the present invention.

The invention claimed is:

1. A method for measuring quality of service at an application level in a telecommunication network, the method comprising:

monitoring operation of an application by a monitoring apparatus through a network interface including:
  monitoring the network interface for data packets transmitted between two network nodes different from the monitoring apparatus;
  receive a data packet as the data packet is being transmitted between the two network nodes;
  filtering the received data packet;
storing network data including the filtered data packet in a buffer of the monitoring apparatus,
transmitting said network data to at least one measuring and signaling apparatus for analysis of the network data at the at least one measuring and signaling apparatus;
detecting a critical situation related to said quality of service, by the at least one measuring and signaling apparatus which is separate from the monitoring apparatus and the two network nodes;
generating, in response to said critical situation, a trigger signal subsequent to said monitoring apparatus transmitting said network data, by the at least one measuring and signaling apparatus;
receiving said trigger signal at a coordination apparatus separate from the monitoring apparatus and the at least one measuring and signaling apparatus;
transmitting, by the coordination apparatus, said trigger signal to said monitoring apparatus; and
in response to the generation of said trigger signal, collecting by an archive apparatus, said data packet stored in said buffer of said monitoring apparatus, wherein the data packet is indicative of a behavior of the telecommunication network.

2. The method of claim 1, wherein the critical situation is detected based on data from a plurality of monitoring apparatuses.

3. The method of claim 1, further comprising measuring the quality of service based on the network data in a synchronized fashion with at least one other monitoring apparatus.

4. The method of claim 1, wherein the archive apparatus is configured to store data from a plurality of monitoring apparatuses.

5. The method of claim 1, further comprising: associating a testing function configured to test the operation of the application to a measuring and signaling function configured to detect the critical situation relating to the quality of service.

6. The method of claim 5, wherein the testing function and said measuring and signaling function co-operate with each other according to an agent/server configuration, in which said testing function acts as an agent and said measuring and signaling function acts as a server.

7. The method of claim 1, wherein the monitoring apparatus is further configured to intercept said trigger signal transmitted on said telecommunication network.

8. The method of claim 1, wherein at least one of the trigger signal and the data packet indicative of the behavior of the network is transmitted through a direct transmission channel.

9. The method of claim 1, wherein storing the network data includes storing data for a specified time window.

10. A system for measuring quality of service at an application level in a telecommunication network, the system comprising:
at least one testing apparatus configured to carry out sessions at the application level on said telecommunication network,
at least one monitoring apparatus configured to:
monitor a network interface for data packets transmitted between two network nodes different from the at least one monitoring apparatus;
receive a data packet as the data packet is being transmitted between the two network nodes;
filter the received data packet;
store the filtered data packet in a buffer of the at least one monitoring apparatus; and
transmit said data packet to at least one measuring and signaling apparatus for analysis of the data packet at the at least one measuring and signaling apparatus;
the at least one measuring and signaling apparatus, separate from the at least one monitoring apparatus and the two network nodes, configured to:
detect a critical situation related to said quality of service; and
generate, in response to said critical situation, a trigger signal subsequent to said at least one monitoring apparatus transmitting said data packet;
a coordination apparatus separate from the at least one monitoring apparatus and the at least one measuring and signaling apparatus, wherein the coordination apparatus is configured to:
receive said trigger signal from said at least one measuring and signaling apparatus; and
transmit said trigger signal to said at least one monitoring apparatus; an archive apparatus configured to collect, in response to the generation of said trigger signal, said data packet stored in said at least one monitoring apparatus, wherein the data packet is indicative of a behavior of the telecommunication network.

11. The system of claim 10, further comprising a plurality of monitoring apparatuses configured to measure and store data indicative of the behavior of the telecommunication network.

12. The system of claim 11, further comprising a plurality of synchronization modules associated with said plurality of monitoring apparatuses to measure said data indicative of the behavior of said telecommunication network in a synchronized fashion.

13. The system of claim 10, wherein the at least one monitoring apparatus further comprises:
a memory configured to store data indicative of the behavior of said telecommunication network, wherein the data includes the filtered data packet, and
a transmission module configured to transmit said data indicative of the behavior of said telecommunication network to said archive apparatus in response to receiving said trigger signal.

14. The system of claim 10, wherein the at least one testing apparatus and said at least one measuring and signaling apparatus mutually co-operate according to a general agent/server configuration, in which said testing apparatus acts as agent and said measuring and signaling apparatus acts as server.

15. The system of claim 10, wherein the at least one monitoring apparatus is configured to monitor for the data packet through at least one interface used by an application in the network.

16. The system of claim 10, wherein the at least one monitoring apparatus comprises a memory dimensioned to store at least a portion of the data packet.

17. The system of claim 10, further comprising at least one transmission channel to forward:
said trigger signal to said at least one monitoring apparatus, and
said data packet from said at least one monitoring apparatus.

18. The system of claim 10, wherein the at least one monitoring apparatus comprises a filtering module configured to intercept said trigger signal transmitted.

19. A non-transitory computer readable media storing computer readable instructions that, when executed, cause a monitoring apparatus to:
monitor operation of an application through a network interface;
monitor the network interface for data packets transmitted between two network nodes different from the at least one monitoring apparatus;
receive a data packet as the data packet is being transmitted between the two network nodes;
filter the received data packet;
store the filtered data packet in a buffer of the at least one monitoring apparatus, and
transmit said data packet to at least one measuring and signaling apparatus for analysis of the data packet at the at least one measuring and signaling apparatus;
the at least one measuring and signaling apparatus, separate from the at least one monitoring apparatus and the two network nodes, configured to:
detect a critical situation related to said quality of service;
generate, in response to said critical situation, a trigger signal subsequent to said at least one monitoring apparatus transmitting said data packet; a coordination apparatus separate from the at least one monitoring apparatus and the at least one measuring and signaling apparatus, wherein the coordination apparatus is configured to:

receive said trigger signal from said at least one measuring and signaling apparatus, and transmit said trigger signal to said at least one monitoring apparatus; an archive apparatus configured to collect, in response to the generation of said trigger signal, said data packet stored in said at least one monitoring apparatus, wherein the data packet is indicative of a behavior of the telecommunication network.

20. The non-transitory computer readable media of claim 19, wherein the critical situation is detected based on data from a plurality of monitoring apparatuses.

21. The non-transitory computer readable media of claim 19, wherein the computer readable instructions, when executed, causes the monitoring apparatus to measure the data indicative of the behavior of said telecommunication network in a synchronized fashion with at least one other monitoring apparatus in the telecommunication network.

22. The non-transitory computer readable media of claim 19, wherein the archive apparatus is a centralized archive which stores data from a plurality of monitoring apparatuses.

* * * * *